(12) United States Patent
Moore et al.

(10) Patent No.: US 6,552,728 B1
(45) Date of Patent: *Apr. 22, 2003

(54) METHOD AND SYSTEM FOR PROVIDING SUBSTITUTE COMPUTER FONTS

(75) Inventors: George M. Moore, Redmond, WA (US); Dennis Richard Adler, Mercer Island, WA (US); Eliyezer Kohen, Mercer Island, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/165,268

(22) Filed: Oct. 1, 1998

Related U.S. Application Data

(63) Continuation of application No. 08/897,374, filed on Jul. 21, 1999, now Pat. No. 5,859,648, which is a continuation of application No. 08/527,291, filed on Sep. 12, 1995, now abandoned, which is a continuation of application No. 08/085,482, filed on Jun. 30, 1993, now abandoned.

(51) Int. Cl.$^7$ ................................. G06F 17/21
(52) U.S. Cl. ................. 345/471; 345/467; 345/472; 707/542
(58) Field of Search ................ 345/467, 468, 345/469, 471–472; 707/542

(56) References Cited

U.S. PATENT DOCUMENTS

| | | | |
|---|---|---|---|
| 3,964,591 A | 6/1976 | Hill et al. ................ 197/1 R |
| 4,591,999 A | * 5/1986 | Logan ................ 364/523 |
| 4,675,830 A | 6/1987 | Hawkins ................ 364/518 |
| 4,933,866 A | 6/1990 | Markoff et al. ........... 364/518 |
| 4,987,550 A | 1/1991 | Leonard et al. ........... 364/521 |
| 5,001,697 A | * 3/1991 | Torres ................ 364/521 |
| 5,042,075 A | 8/1991 | Sato ................ 382/47 |
| 5,099,435 A | 3/1992 | Collins et al. ............ 395/150 |
| 5,167,013 A | 11/1992 | Hube et al. ............. 395/110 |
| 5,185,818 A | * 2/1993 | Warnock ................ 382/54 |
| 5,218,460 A | 6/1993 | Nakajima ............... 358/456 |
| 5,257,016 A | 10/1993 | Fuji et al. ............ 345/143 |
| 5,274,365 A | * 12/1993 | Martinez et al. ........... 345/128 |
| 5,281,959 A | 1/1994 | Martinez et al. ........... 345/128 |
| 5,291,186 A | 3/1994 | Martinez et al. ........... 345/128 |
| 5,304,989 A | 4/1994 | Martinez et al. ........... 345/128 |
| 5,319,358 A | 6/1994 | Martinez et al. ........... 345/141 |
| 5,325,479 A | 6/1994 | Kaasila ................ 395/151 |

(List continued on next page.)

FOREIGN PATENT DOCUMENTS

| | | | | |
|---|---|---|---|---|
| EP | 0478339 A1 | 4/1992 | ............ B41J/5/30 |
| EP | 0518554 A2 | 12/1992 | ............ G09G/5/24 |

OTHER PUBLICATIONS

"Adobe's SuperATM: Super Font Swapper," *MacUser*, Feb., 1993, p. 47.

"Microsoft Licenses Panose Font Scheme; Numbering System for TrueType," *The Seybold Report on Desktop Publishing*, 5(10) 40–41, Jun., 1991.

*Primary Examiner*—Matthew Luu
*Assistant Examiner*—Daniel J Chung
(74) *Attorney, Agent, or Firm*—Banner & Witcoff, Ltd.

(57) ABSTRACT

A method and system for providing a substitute font that visually approximates a selected font that is unavailable in a computer system is provided. In a preferred embodiment of the present invention, the method and system first selects as the substitute font a font that is available in the computer system. The method and system then adjusts the overall widths of the characters of the substitute font to match the overall widths of the corresponding characters of the selected font. This causes the same combinations of characters of the substitute font and of the selected font to have substantially the same size and appearance. The method and system then makes the substitute font available to a program that has requested the selected font.

24 Claims, 9 Drawing Sheets

U.S. PATENT DOCUMENTS

| | | | |
|---|---|---|---|
| 5,495,577 A | 2/1996 | Davis et al. | 395/144 |
| 5,506,940 A | 4/1996 | Bamford et al. | 395/110 |
| 5,533,174 A | 7/1996 | Flowers, Jr. et al. | 395/114 |
| 5,537,131 A * | 7/1996 | Mitsuhashi et al. | 345/128 |
| 5,548,695 A | 8/1996 | Asano et al. | 395/133 |
| 5,563,626 A * | 10/1996 | Speed | 345/141 |
| 5,590,247 A * | 12/1996 | Mikuni | 395/110 |
| 5,664,086 A * | 9/1997 | Brock et al. | 345/468 |
| 5,796,409 A * | 8/1998 | Hersch et al. | 345/468 |
| 6,055,061 A * | 4/2000 | Sato | 358/1.11 |
| 6,073,148 A * | 6/2000 | Rowe et al. | 707/542 |

\* cited by examiner

METHOD AND SYSTEM FOR PROVIDING SUBSTITUTE COMPUTER FONTS

CROSS-REFERENCE TO RELATED APPLICATIONS

This application is a continuation of U.S. patent application Ser. No. 08/897,374, filed Jul. 21, 1997 now U.S. Pat. No. 5,859,648 which is a file wrapper continuation of U.S. patent application Ser. No. 08/527,291, filed Sep. 12, 1995, now abandoned, which is a file wrapper continuation of U.S. patent application Ser. No. 08/085,482, filed Jun. 30, 1993, now abandoned.

TECHNICAL FIELD

The invention relates generally to a method and system for providing computer fonts, and, more specifically, to a method and system for providing a substitute computer font for a font that is unavailable within a computer system.

BACKGROUND OF THE INVENTION

Most general purpose computer systems (computers) are able to display text, comprised of characters (letters, numerals, and other symbols), on attached display devices, such as monitors and printers. A monitor consists of a grid of points, or pixels, each of which can be individually illuminated. Computer printers and other computer display devices also use pixels to display images.

In order to display text on a display device, computers use one or more raster fonts. A raster font is comprised of character bitmaps. Each character bitmap contains data reflecting which pixels in a subset of the display grid must be illuminated in order to form a particular character. When a computer needs to display a particular character at a display location, it accesses the bitmap for that character. The computer then turns the illumination of pixels near the display position on or off in accordance with the data stored in the character bitmap. FIG. 1A is a diagram showing how one possible. bitmap of the letter A could be displayed on a display device.

At one point, computers each used only a single raster font, permanently stored in read only memory. Since then, computers have been adapted to use several different raster fonts simultaneously. This permits a user to display text in more than one typeface and point size. (A typeface is a specific design for a set of characters. Point size is a measurement of the height of a font's characters.) These raster fonts are now stored in writeable random access memory, which allows existing raster fonts to be altered and new raster fonts added.

Computers now also use another, more robust type of font, called outline fonts. Outline fonts contain an outline for each character, comprised of straight lines and curves that form the shape of the character's outline. FIG. 1B is a diagram showing one possible outline of the letter A. The outline font describes these straight lines and curves in terms of an arbitrary system of coordinates. The computer can resize these character outlines to any point size, then convert them to a raster font. Outline fonts also contain hints, which are routines that, when executed, adjust the shapes of the outlines for various point sizes to improve their appearance.

Computers use outline fonts to create raster fonts in various sizes. Computers also transmit outline fonts to smart display devices that are themselves able to create raster fonts from the outline fonts. Many computers now store several outline fonts, each corresponding to a different typeface.

Using outline fonts, computers can now create raster fonts dynamically in different typefaces in response to the needs of users. Computer programs like ProvideRaster provide this service. FIG. 2 is a flow diagram of the ProvideRaster program. This program is an example of a font manager program that is called by application programs (applications), such as a word processor or a spreadsheet, when they require a raster font. The program is passed a requested typeface name, point size, and horizontal and vertical densities of the intended display device. The program returns a raster font of the requested typeface and point size for the intended display device.

In step 201, if a raster font of the correct point size and horizontal and vertical pixel density is available within the computer, then the program continues at step 202, else the program continues at step 203. In step 202, the program retrieves the appropriate raster font. The program then returns the retrieved raster font to the application program.

In step 203, if an outline font for the requested typeface is available within the computer, then the program continues in step 204, else the program continues in step 205 to create a substitute font for the unavailable outline font. In step 204, the program retrieves the outline font for the requested typeface, which contains both character outlines and hints. The program then continues at step 206.

In step 205, the program calls CreateSubstituteFont to produce a substitute outline font that visually approximates the unavailable outline font. The program passes CreateSubstituteFont the unavailable outline font name. The CreateSubstituteFont program returns a substitute outline font for the unavailable font, which contains both character outlines and hints. The details of CreateSubstituteFont are discussed further below. When CreateSubstituteFont returns, the program continues at step 206.

In step 206, the program calls a ConvertToRaster program, passing it the outline font retrieved or created, the requested point size, and the requested horizontal and vertical densities. The program then returns the raster font created by ConvertToRaster to the application program.

FIG. 3 is a flow diagram of ConvertToRaster. The program receives as parameters an outline font, a requested point size, and a requested horizontal and vertical density. The outline font contains character outlines and hints.

In step 301, the program resizes the character outlines of the outline font to the requested point size by multiplying the coordinates that define the outlines' lines and curves by the requested point size. This alters the height and width of each character. In step 302, the program applies the hints of the outline font to the magnified outlines.

FIGS. 4A–B are screen images demonstrating the need to use hints to improve the appearance of rasterized outlines. FIG. 4A is a screen image showing a letter "n" that has been rasterized without first being hinted. The unhinted letter's left base serif 401 does not match its right base serif 402. Further, its left vertical stem 403 is wider than its right vertical stem 404. Finally, its crown 405 is skewed toward the top row of pixels. FIG. 4B is a screen image showing a letter "n" that was rasterized after being hinted. The hinted letter's base serifs 411 and 412 are of the same width relative to their respective vertical stems 413 and 414. Those vertical stems are both now two pixels wide. The height of its crown 415 has been balanced by moving the vertical stems apart slightly. The hints demonstrated by FIG. 4B ensure the symmetry and regularity of the characters of a font. Other traditional hints ensure the vertical alignment of corresponding features of characters. Further traditional hints ensure good color—that is, consistent weighting among characters of a font. Applying hints to a character is said to regularize the character.

In step 303, the program rasterizes the hinted outlines of the outline font by superimposing a grid, corresponding to the horizontal and vertical density of the intended display device over the hinted outlines, then turning on any pixels of the grid whose centers fall within the hinted outlines. This technique is well known in the art of digital typography. The program returns the resulting raster font to the application program, which may use it to display text. The raster font may also be stored in a buffer to be used to satisfy any identical requests received in the future.

The function served by CreateSubstituteFont is quite important. It is difficult for a computer user to anticipate which outline fonts he or she will need. Outline fonts will hereafter be referred to simply as fonts. Since individual fonts can be expensive to license, and even more expensive to independently develop, it has become quite useful for a computer to be able to construct a substitute font for an unavailable font.

The substitute fonts created by CreateSubstituteFont should: (1) be similar in appearance to the unavailable font, if possible; and (2) have exactly the same overall character widths as the unavailable font. These requirements are dictated by the paradigm of using the substitute font in place of the unavailable font to display a particular section of text in a document. The first requirement ensures that a sense of any aesthetics intended for the section will be conveyed. The second requirement ensures that lines and pages will break at the correct points.

Existing implementations of CreateSubstituteFont work by selecting an available font (the basis font) on which to base the substitute font, then modifying the basis font to create the substitute font. Basis font selection processes vary, as do their effectiveness at selecting a basis font with an appearance similar to the unavailable font.

Modification processes typically consist only of adding space before or after each character of the basis font whose overall width is smaller than the corresponding character of the unavailable font. Such implementations produce fonts with the same overall character widths in the case of characters of the basis font whose overall widths are smaller than or equal to those of the corresponding characters of the unavailable font. Such implementations cannot, however, produce fonts with the same overall character widths in the case of characters of the basis font whose overall widths are larger than those of the corresponding character of the unavailable font. It can be seen that these implementations of CreateSubstituteFont satisfy the first requirement for substitute fonts to varying degrees, and the second, more important requirement only sporadically.

SUMMARY OF THE INVENTION

It is an object of the present invention to provide a method and system for adjusting the overall widths of characters of a substitute font to match the overall widths of corresponding characters of an unavailable font.

It is another object of the present invention to provide a method and system for adjusting the overall widths of the characters of a substitute font by scaling each character horizontally.

It is a further object of the present invention to provide a method and system for adjusting the overall widths of the characters of a substitute font by adjusting the leading width before and the leading width after each character.

These and further objects, which will become apparent as the invention is more fully described below, are obtained by an improved method and system for providing a substitute font that visually approximates a selected font that is unavailable in a computer system. In a preferred embodiment of the present invention, the method and system first selects a font that is available in the computer system as the substitute font. The method and system then adjusts the overall widths of the characters of the substitute font to match the overall widths of the corresponding characters of the selected font. This causes the same combinations of characters of the substitute font and of the selected font to have substantially the same size and appearance. The method and system then makes the substitute font available to a program that has requested the selected font.

DETAILED DESCRIPTION OF THE INVENTION

The present invention relates to a method and system for providing a substitute outline font for an outline font that is unavailable within a computer system. Outline fonts will hereafter be referred to simply as fonts. In a preferred embodiment of the present invention, the ProvideRaster program calls a CreateBestFont program (CreateBestFont) in place of CreateSubstituteFont to produce a substitute font for an unavailable font.

CreateBestFont is passed the unavailable font name. The program proceeds by attempting to identify a visually similar basis font selected by a Map program whose character widths are all within a predetermined tolerance of the unavailable font's character widths. If such a basis font exists, the program adjusts the space before and after every character of the basis font so that the overall width of each of its characters is equal to that of the corresponding character of the unavailable font. The resulting substitute font has an appearance that is similar to that of the unavailable font; the same overall character widths as the unavailable font; and the same color as the basis font, which is presumably good.

Otherwise, the program selects a font whose characters it can modify to be the correct width. It then calls a Scale program (Scale) to do the actual modification. The resulting substitute font has an appearance that is somewhat similar to that of the unavailable font, the same overall character widths as the unavailable font, and good color. Modifiable fonts contain special hints that ensure that the modifiable fonts will have consistent stem width when modified.

Figure 1A:
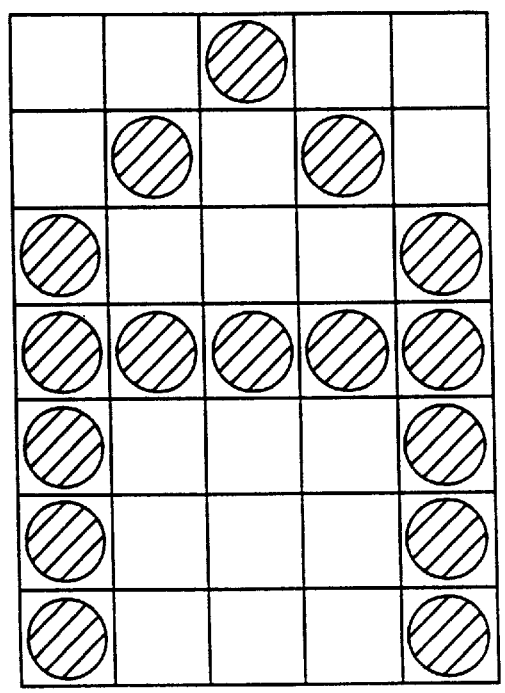
FIG. 1A is a diagram showing how one possible bitmap of the letter A could be displayed on a display device.
Figure 1B:
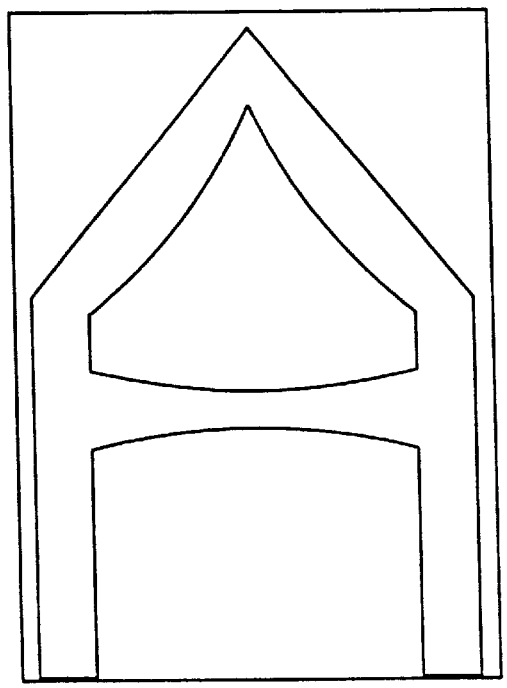
FIG. 1B is a diagram showing one possible outline of the letter A.
Figure 2:
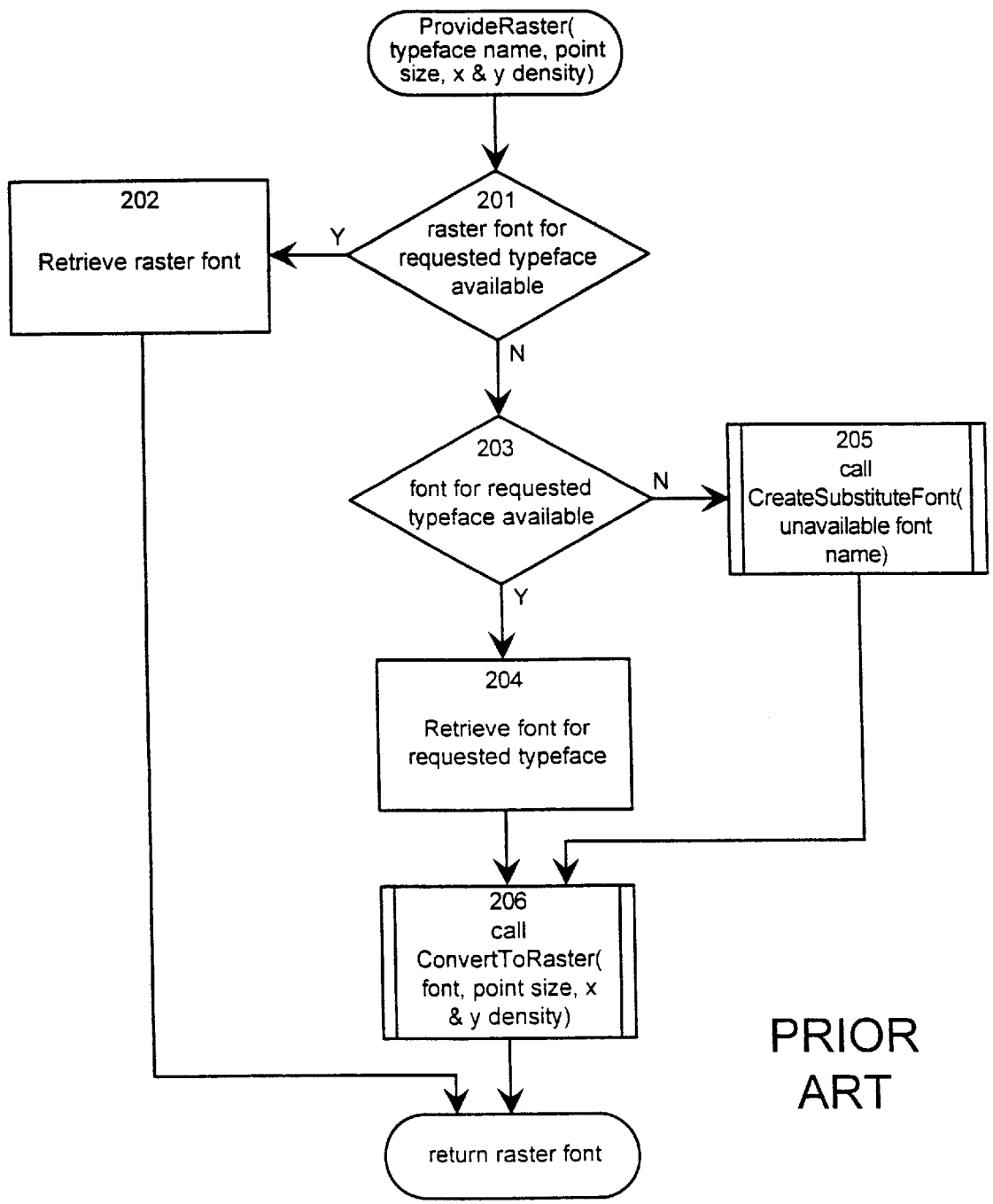
FIG. 2 is a flow diagram of ProvideRaster.
Figure 3:
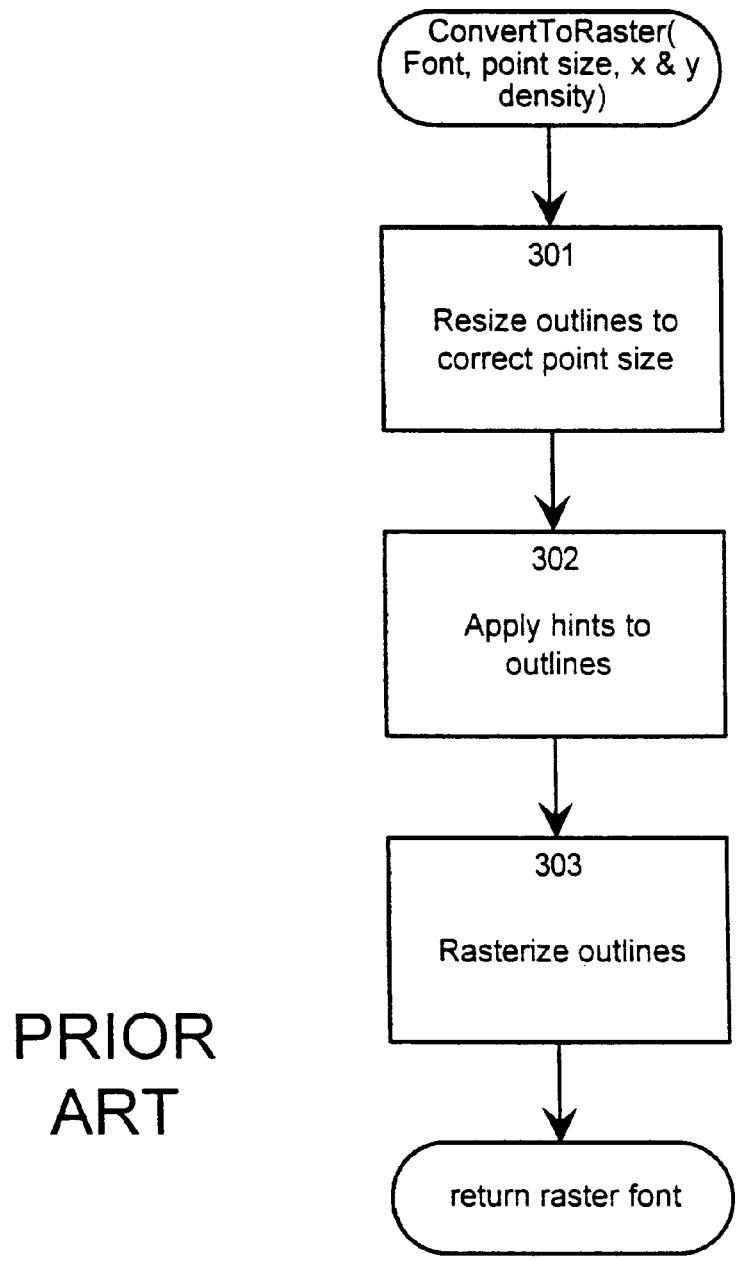
FIG. 3 is a flow diagram of ConvertToRaster.
Figure 4A:
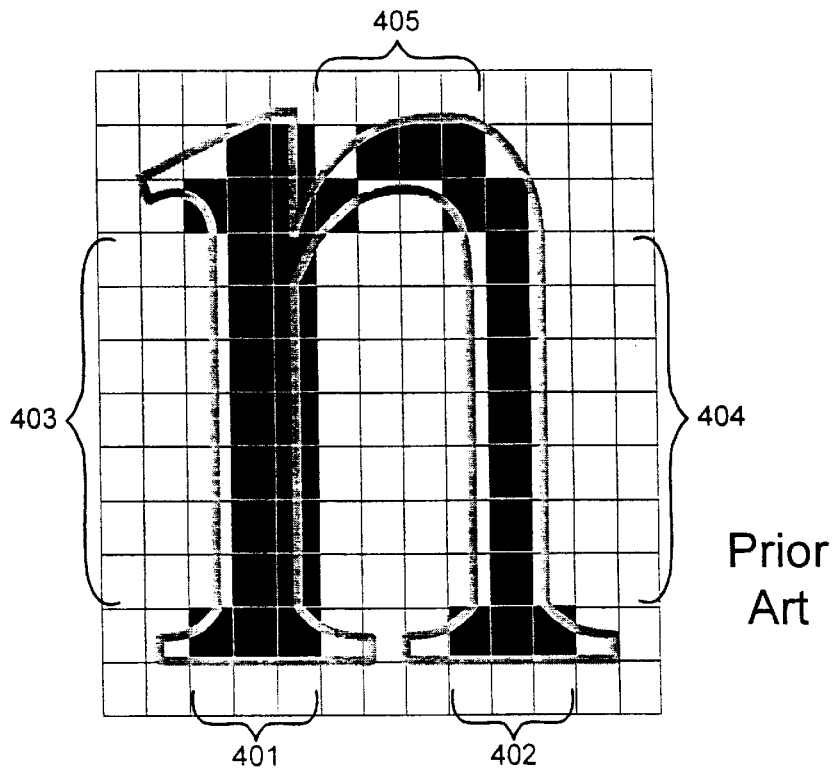
FIG. 4A is a screen image showing a letter "n" that has been rasterized without first being hinted.
Figure 4B:
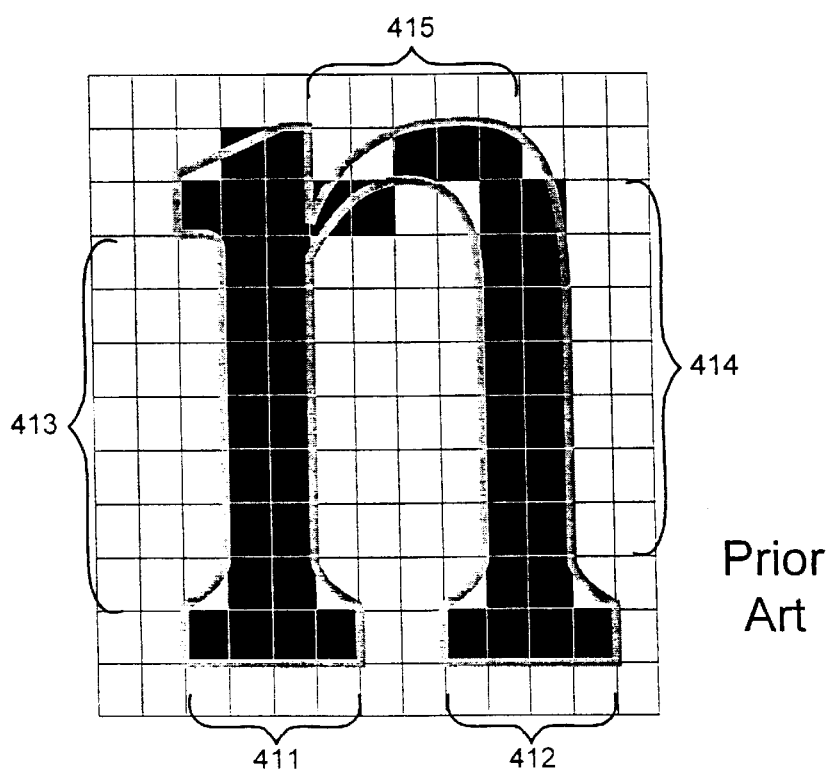
FIG. 4B is a screen image showing a letter "n" that was rasterized after being hinted.
Figure 5:
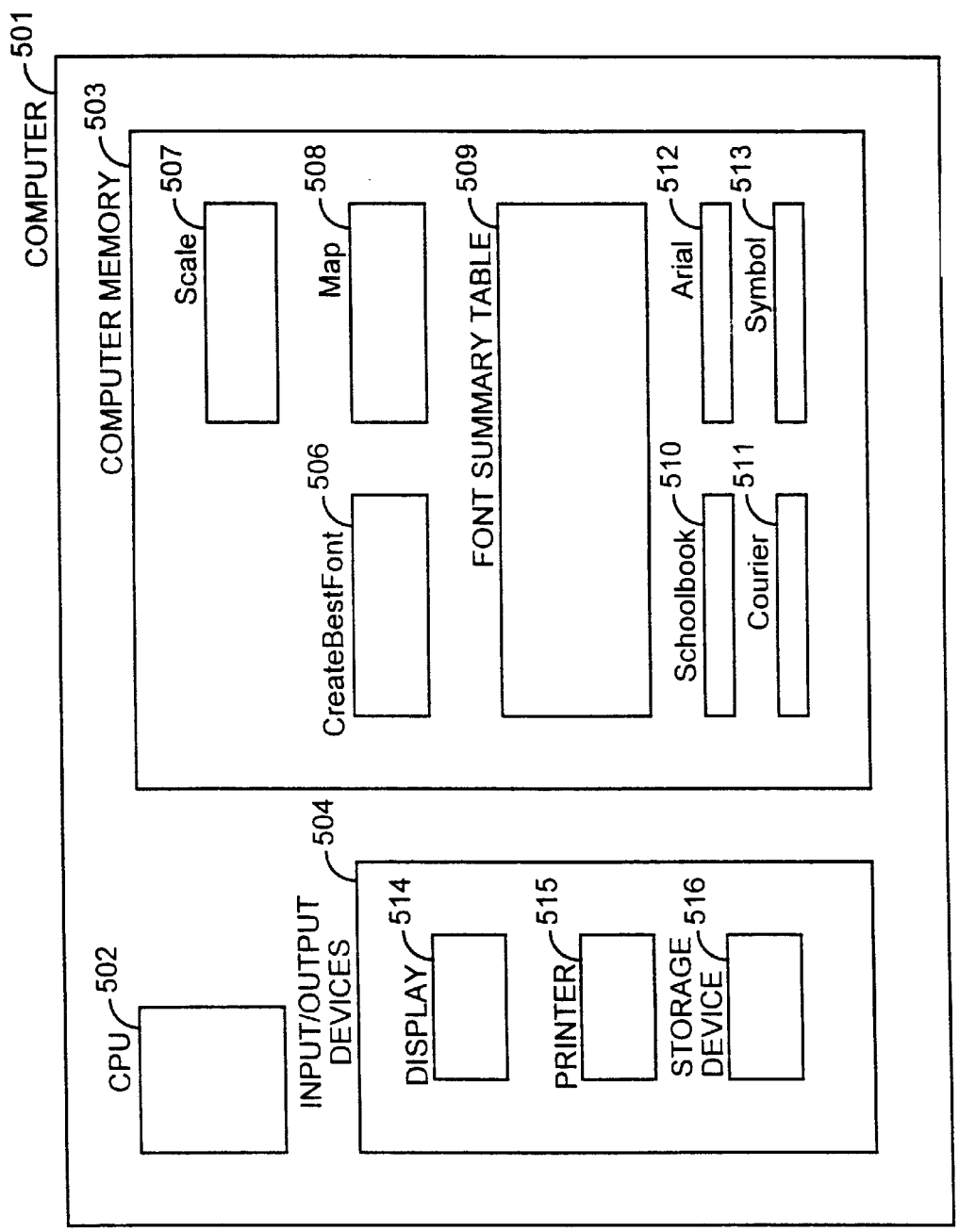
FIG. 5 is a high-level diagram of the general-purpose computer system on which the CreateBestFont, Map, and Scale programs preferably execute.

FIG. 5 is a high-level diagram of the general-purpose computer system on which the CreateBestFont, Map, and Scale programs preferably execute. The computer 501 contains a central processing unit (cpu) 502, a computer memory 503, and input/output devices 504. The computer memory contains the CreateBestFont program 506, the Scale program 507, the Map program 508, a font summary table (table) 509, and fonts 510–513. The input/output devices include a display device 514, a printer 515, and a storage device 516 such as a hard disk drive. The font summary table contains summary information on a large number of popular fonts. Each row of the table corresponds to a single font, and contains that font's name, the overall width of each of the font's characters, an indication of whether the font is a serif font or a sans serif font, and an encoded visual appearance assessment for the font.

Programs such as ProvideRaster call CreateBestFont to produce a substitute font for an unavailable font, passing it the unavailable font name. CreateBestFont proceeds by attempting to identify a visually similar font whose character widths are all within a predetermined tolerance of the unavailable font's character widths. If such a basis font exists, the program adjusts the space before and after every character of the basis font so that the width of each of its characters is equal to that of the corresponding character of the unavailable font. Otherwise, the program selects a modifiable font whose characters it can modify to be the correct width. It then calls Scale to do the actual modification. Modifiable fonts contain special hints that ensure that the resultant fonts will have good color.

Figure 6:
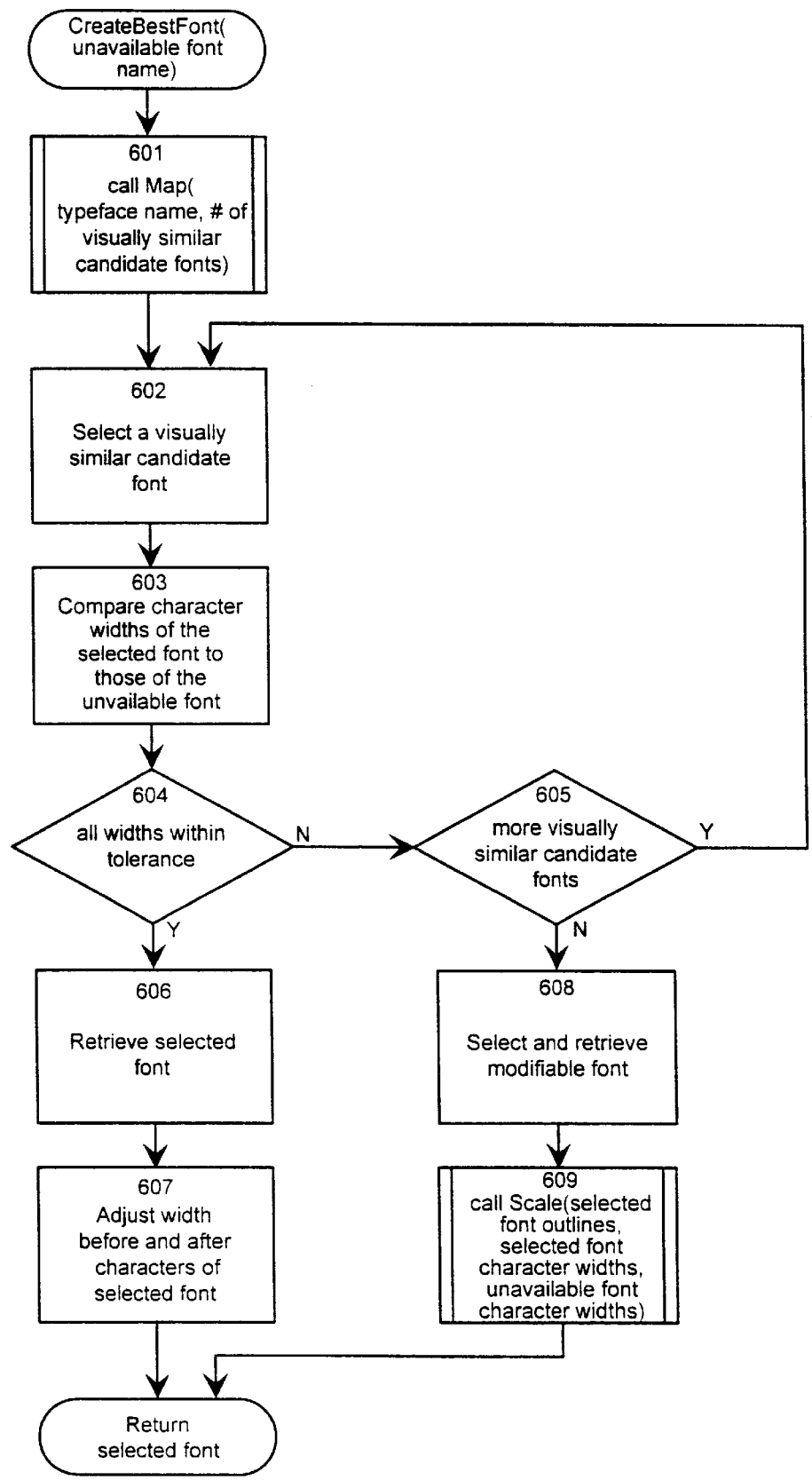
FIG. 6 is a flow diagram of CreateBestFont.

FIG. 6 is a flow diagram of CreateBestFont. In step 601, the program calls the Map program to identify visually similar fonts that are available within the computer. The program passes Map the unavailable font name and a predetermined number of candidate fonts to return. Map uses the encoded visual appearance assessments (codes) for the most popular fonts in general use stored in the font summary table. Fonts and their codes may be included in the table even if no font is available for them within the computer. In a preferred embodiment, the codes are determined in accordance with the ElseWare PANOSE™ font matching system. Codes determined in accordance with the PANOSE system contain information on family kind, serif style, weight, proportion, contrast, stroke variation, arm style, letter form, midline, and X-height. In a further preferred embodiment, codes for at least 100 fonts are included in the table.

Figure 7:
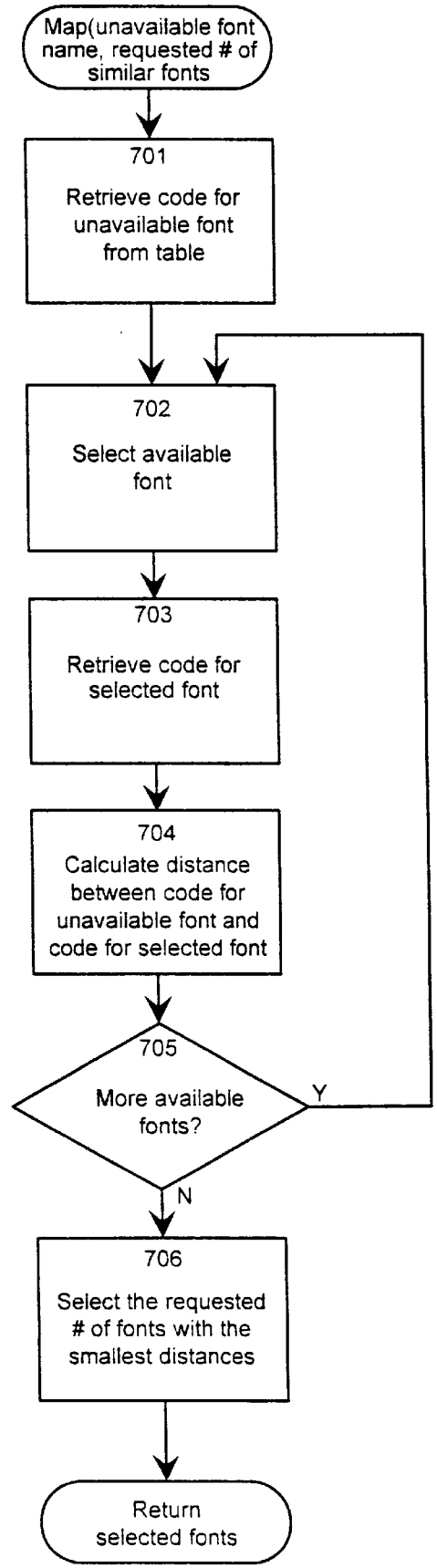
FIG. 7 is a flow diagram of a well-known embodiment of Map.

FIG. 7 is a flow diagram of a well-known embodiment of Map. In step 701, the program retrieves the code for the unavailable font from the font summary table. In steps 702–705, Map calculates the distance from the unavailable font for each of the available fonts. In step 702, the program selects an available font. In step 703, the program retrieves the code for the selected font from the table. In step 704, the program calculates the distance between the code for the unavailable font and the code for the selected font. This calculation involves, for each digit of the code, squaring the difference between the unavailable font digit value and the selected font digit value. The squares are then added to yield the distance. In step 705, if more available fonts remain, then the program continues at step 702, else the program continues at step 706. In step 706 the program selects the requested number of fonts with the smallest distances from the unavailable font. The program then returns the selected fonts to CreateBestFont.

Table 1 below is a partial simplified view of the font summary table. It shows the font name and associated code for each of several fonts. The description below details how Map would behave if this font summary table was present on the system and Map was called with the parameters (unavailable font name=Times New Roman, requested number of similar fonts=2).

TABLE 1

| Font Name | Code |
| --- | --- |
| Arial | 2 2 2 2 2 2 2 2 2 2 |
| Courier | 0 2 2 3 4 5 7 6 8 9 |
| Schoolbook | 2 2 2 2 5 5 5 8 8 8 |
| Symbol | 9 8 7 6 5 4 3 2 1 0 |
| Times New Roman | 0 1 2 3 4 5 6 7 8 9 |
| 0 | 0 |
| 0 | 0 |
| 0 | 0 |

Map first retrieves the code for the unavailable font, Times New Roman, from the table--0123456789. Map then selects the first available font, Arial, and retrieves its code--2222222222. Then Map calculates the distance between the code for Times New Roman and the code for Arial. This calculation involves, for each code digit, squaring the difference between the unavailable font code digit and the selected font code digit. The squares are then added to yield the distance. The distance between Arial and Times New Roman is:
$(2-0)^2+(2-1)^2+(2-2)^2+(2-3)^2+(2-4)^2+(2-5)^2+(2-6)^2+(2-7)^2+(2-8)^2+(2-9)^2=4+1+0+1+4+9+16+25+36+49=145$.
This process of calculating the distance from Times New Roman is then repeated for each of any other remaining available fonts in the table. Map then selects the two fonts with the smallest distances from Times New Roman. These are Courier, with a distance of 3, and Schoolbook, with a distance of 10. Map then returns these two fonts.

In an alternate embodiment, each font available on the system is stored with a list of fonts to which it is visually similar. Each font is listed with a relative similarity rating value. In this embodiment, Map identifies fonts that are visually similar to the unavailable font by reading the list associated with each available font to identify the fonts that are similar to the unavailable font, and returning the requested number of fonts whose similarity rating values are the highest.

In steps 602–605, the program selects each visually similar candidate font in turn, checking to see whether its character widths are within a predetermined tolerance of those of the requested font. In step 602, the program selects a visually similar font from among the candidates returned by Map. In step 603, the program compares the overall width of each character of the selected font to that of the corresponding character of the unavailable font.

Figure 8:
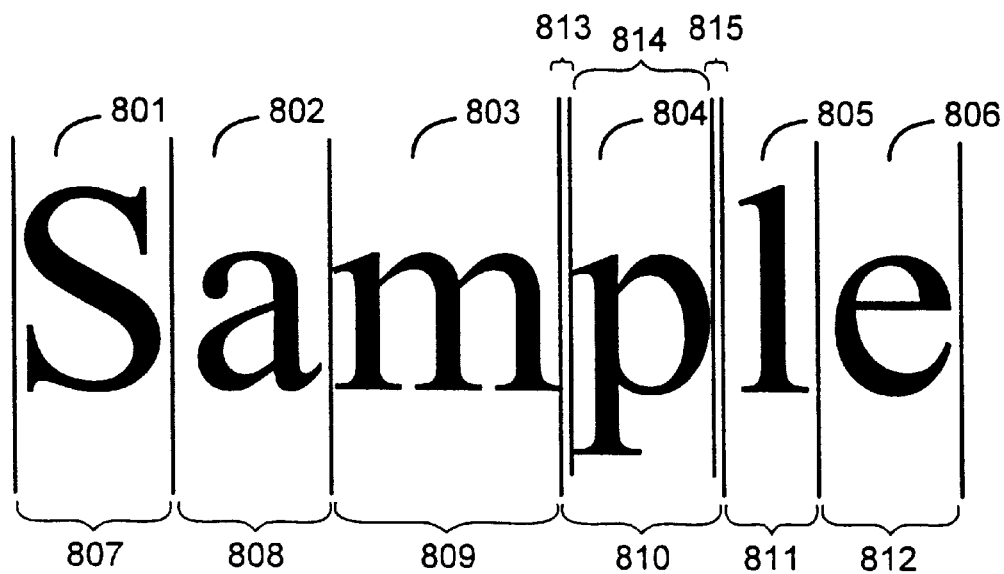
FIG. 8 is a diagram showing the overall width of a sample character, and its relationship to other horizontal measures of the character.

FIG. 8 is a diagram showing the overall width of a sample character, and its relationship to other horizontal measures of the character. Characters 801–806 have been displayed by an application program displaying the word "Sample" in the Times New Roman font. The character "p" 804 has an overall width 810, made up of a leading width 813, a horizontal extent 814, and a trailing width 815. The other characters shown also have these measures.

The overall widths of the characters of popular fonts are stored in the font summary table. In step 603, the program accesses the overall widths from the rows of the table corresponding to the unavailable font and the selected font in order to carry out its comparison of them.

In step 604, if all of the overall widths of the characters of the selected font are within a threshold proportion of the overall widths of the corresponding characters of the unavailable font, then the program continues at step 606 to use the selected font, else the program continues at step 605. In step 605, if more visually similar candidate fonts remain, then the program continues at step 602 to select one of them, else the program continues at step 608.

In an alternate embodiment, instead of calling Map to request a relatively large number of visually similar fonts, the program calls Map to request a smaller number of visually similar fonts. In this embodiment, the program calls Map again for more visually similar fonts if no fonts in the first group had overall character widths within a threshold proportion of the overall widths of the corresponding characters of the unavailable font.

Steps 606–607 are the path for generating the substitute font when a visually similar font has acceptable character widths. In step 606, the program retrieves the font corresponding to the selected font from memory. The font is preferably retrieved from a file stored on the storage device, using the font name. This becomes the basis font. In step 607, the program adjusts the leading and trailing width of each character of the basis font to make its overall width equal to the overall width of the corresponding character in the unavailable font. The program then returns the basis font, and the basis font becomes the substitute font.

Steps 608–609 are the path for generating the substitute font when no visually similar font has acceptable character widths. In step 608, the program selects and retrieves from memory a font that has been specially adapted to support the horizontal expansion and compression of the overall widths of its characters. The font is preferably retrieved from a file stored on the storage device, using the font name. These modifiable fonts have been adapted by adding special hints that ensure that the color of the font is good after expansion and/or compression by regularizing vertical stem width among characters. Special hints are discussed further in conjunction with Scale. The selected modifiable font becomes the basis font.

In a preferred embodiment, it is sufficient for there to be only two modifiable fonts with specials hints, one a font for a serif font and one a font for a sans serif font. (Characters of serif fonts have short lines or ornaments at the ends of their stems, while characters of sans serif fonts do not.) In this embodiment, the selection process simply selects the serif font as the basis font for serif unavailable fonts and the sans serif font as the basis font for sans serif unavailable fonts. An indication of whether each popular font is a serif font or a sans serif font is stored in the table. In this embodiment, the program accesses the row of the table corresponding to the unavailable font to determine whether the unavailable font is a serif or a sans serif font.

In step 609, the program calls Scale to horizontally scale each character of the selected basis font to the correct width. The program passes the outlines of the basis font, the overall character widths of the basis font, and the overall character widths of the unavailable font to Scale. When Scale returns, the program returns the scaled basis font. This becomes the substitute font.

Figure 9:
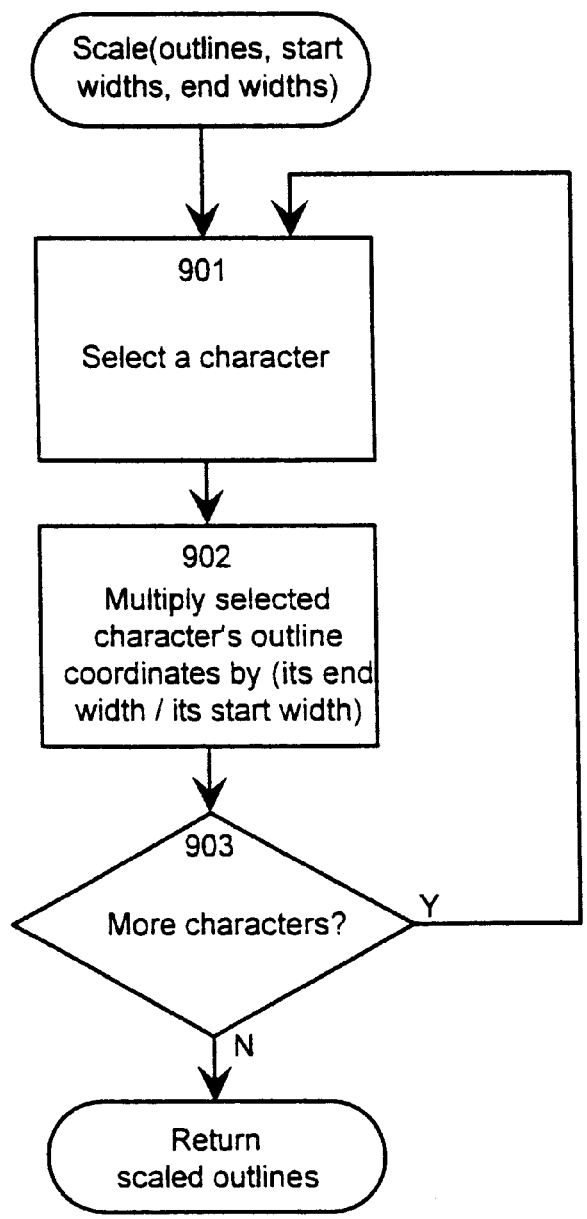
FIG. 9 is a flow diagram of Scale.

FIG. 9 is a flow diagram of Scale. The program receives as parameters a set of character outlines, starting overall character widths, and ending overall character widths. The program scales each character outline to the ending width specified. In steps 901–903, the program cycles through all of the character outlines, scaling each one. In step 901, the program selects a character outline. In step 902, the program scales the selected character outline to the correct width by multiplying each of its outline coordinates by its starting overall character width and dividing it by its ending overall character width. In step 903, if more character outlines remain, then the program continues at step 901 to select one of them, else the program returns the scaled outlines.

Figure 10:
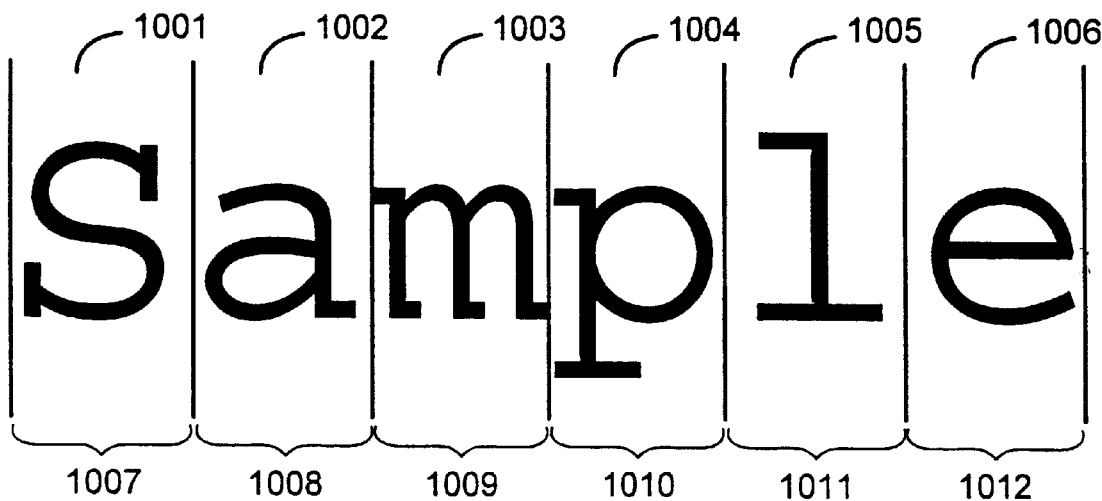
FIG. 10 is a diagram showing the overall width of sample characters of a font called Courier.

FIG. 10 is a diagram showing the overall widths of sample characters of the Courier font. The word "Sample" is formed by characters 1001–1006, having respective overall widths 1007–1012. Overall widths 807–812 (Times New Roman) and 1007–1012 (Courier) for the characters displayed are expressed numerically in columns 2 and 3 of Table 2 below, which lists characters alphabetically, with capitals first.

TABLE 2

| Character | Courier Width | Times New Roman Width | Scale Multiplier |
|---|---|---|---|
| ... | | | |
| S | 100 | 100 | 1 |
| ... | | | |
| a | 100 | 85 | .85 |
| ... | | | |
| e | 100 | 80 | .8 |
| ... | | | |
| l | 100 | 55 | .55 |
| m | 100 | 140 | 1.4 |
| ... | | | |
| p | 100 | 105 | 1.05 |
| ... | | | |

If Times New Roman was the unavailable font, and CreateBestFont selected Courier as the modifiable font and called Scale in order to scale the character widths of Courier to those of Times New Roman, Scale would proceed as follows. Scale's outlines parameter contains the character outlines from the Courier font. The start widths parameter contains the overall widths for the characters of the Courier font. The end widths parameter contains the overall widths of the Times New Roman font. For each character, Scale multiplies that character's outline coordinates by the ratio of its end width over its start width. In the case of the character "S", Scale would multiply the outline coordinates by 100/100=1. The multipliers for other selected characters are shown in the fourth column of Table 2. After scaling all the outlines, Scale would return them to CreateBestFont.

The special hints included in the adapted fonts must correct irregularities caused by the horizontal scaling process. The special hints, along with the traditional hints of the basis modifiable font, are applied to the scaled outlines of the substitute font by ConvertToRaster in step 302. In a preferred embodiment, the special hints identify the character of the selected font that was horizontally scaled the least by Scale. The special hints then extract the vertical stem width of the least scaled character and apply it to every other character in the selected font. This involves identifying the vertical stems of each character, then moving the edges of the vertical stems either together or apart so that the width of each vertical stem matches the width of the least scaled character's vertical stems.

In a further preferred embodiment, Scale stores an indication of which character it horizontally scaled the least and the scaling factor applied to that character for retrieval by the hints. ConvertToRaster preferably executes the hints for the least scaled character first. When executed, the hints for the least scaled character set a flag associated with the font specifying that, when the hints for the other characters are executed, their special hints sections will be executed. The hints for the least scaled character further access the scaling factor and set a standard vertical stem width value, represented in font units. When the hints for each of the other characters are executed, the character's special hints section is executed. The special hints section consists of instructions that override the distance, in font units, between character control points on the left and right sides of each of the character's vertical stems with the stored vertical stem width of the least scaled character. Thus overridden, when rasterized, the vertical stems of this character will be the same number of pixels wide as those of the least scaled character, resulting in a font with even color on each of the vertical stems.

While this invention has been shown and described with reference to preferred embodiments, it will be understood by those skilled in the art that various changes or modifications in form and detail may be made without departing from the spirit and scope of this invention. For example, instead of scaling the characters of a basis font horizontally to match an unavailable font, the facility could scale the characters of the basis font vertically to match the unavailable font. In this case, special hinting would regularize horizontal stem height instead of vertical stem width. Also, CreateBestFont could use methods other than those described to identify visually similar fonts. Further, the invention could be implemented within a smart display device instead of a general purpose computer. Still further, the fonts involved need not be for Roman alphabets. The same techniques could be applied to such diverse alphabets as Russian, Hebrew, Japanese, or Korean, or to nonalphabetic symbol fonts.

We claim:

1. A method in a computer system for providing a substitute font that visually approximates a requested font that is unavailable in the computer system, the requested font and the substitute font having respective sets of characters, each character having an overall width, the overall widths of the characters of the substitute font having a leading width, an extent width, and a trailing width, the method comprising:

decreasing the overall widths of the characters of the substitute font to match the overall widths of corresponding characters of the requested font by decreasing at least one of the leading and the trailing widths without adjusting the extent width so that the visual appearance of each character of the substitute font is not changed; and outputting characters, which were requested to be output in the requested font, using the substitute font so that the characters are displayed with overall widths that match the overall widths as if the characters had been displayed using the requested font.

2. The method of claim 1 wherein the computer system contains a plurality of fonts and further including comparing the characters of each of the fonts in the computer system to the characters of the requested font, and selecting as the substitute font a font that is visually similar to the requested font.

3. A method in a computer system for providing a second font for a first font having characters with overall widths, the first font having a numerical characterization of its visual characteristics, the method comprising:

identifying one or more fonts that are available within the computer system to replace the first font having numerical characterizations of their visual characteristics that differ from that of the first font by less than a certain amount;

selecting one of the identified fonts as the second font, the selected font having characters with overall widths, the overall width including a leading width, an extent width, and a trailing width; and for each character of the second font, decreasing the leading width or trailing width, so that the overall width is equal to the overall width of the corresponding character of the first font and so that the visual appearance of each character of the second font is not changed.

4. The method of claim 3 including regularizing the characters of the second font.

5. The method of claim 4 including converting each of the regularized characters of the second font to a character bitmap.

6. The method of claim 3 in which the selecting selects the most visually similar font for which the overall width of each character deviates from the corresponding character of the first font by less than a threshold proportion.

7. The method of claim 3 in which the selecting selects the font for which the overall width of each character deviates the least from that of the corresponding character of the first font.

8. A method in a computer system for providing a substitute font that visually approximates a requested font that is unavailable in the computer system, the requested font and the substitute font having respective sets of characters, each character having an overall size, the overall sizes of the characters of the substitute font having a first size, an extent size, and a second size, the method comprising:

decreasing the overall sizes of the characters of the substitute font to match the overall sizes of corresponding characters of the requested font by decreasing at least one of the first and the second sizes without adjusting the extent size so that the visual appearance of each character of the substitute font is not changed; and outputting characters using the substitute font so that the characters are displayed with overall sizes that match the overall sizes as if the characters had been displayed using the requested font.

9. The method of claim 8 wherein the computer system contains a plurality of fonts and further including comparing the characters of each of the fonts in the computer system to the characters of the requested font, and selecting as the substitute font a font that is visually similar to the requested font.

10. The method of claim 8 wherein the size is a width of a character and wherein the first size is a trailing width and the second size is a leading width.

11. A computer-readable medium containing instructions for causing a computer system to provide a second font for a first font, the first and second font having characters, each character having an overall size, the overall sizes of the characters of the second font having a first size, an extent size, and a second size, by:

decreasing the overall sizes of the characters of the second font to match the overall sizes of corresponding characters of the first font by decreasing at least one of the first and the second sizes without adjusting the extent size; and outputting characters using the second font with the overall size of its characters adjusted so that the characters are displayed with overall sizes that match the overall sizes as if the characters had been displayed using the first font.

12. The computer-readable medium of claim 11 wherein the computer system contains a plurality of fonts and further including comparing the characters of each of the fonts in the computer system to the characters of the first font, and selecting as the second font a font that is visually similar to the first font.

13. The computer-readable medium of claim 11 wherein the size is a width of a character and wherein the first size is a trailing width and the second size is a leading width.

14. A computer system for providing a second font for a first font having characters with overall widths, comprising:
   an identification component that identifies one or more fonts within the computer system that are similar in their visual appearance to the visual appearance of the first font;
   a selection component that selects one of the identified fonts as the second font, the selected font having characters with overall widths, the overall width including a leading edge, an extent width, and a trailing width; and
   an adjusting component that decreases the leading width or trailing width of characters of the selected font, so that the overall width of each character is approximately equal to the overall width of the corresponding character of the first font.

15. The computer system of claim 14 including a regularizing component to regularize the characters of the second font.

16. The computer system of claim 15 wherein the regularizing component converts the characters of the second font to a character bitmap.

17. The computer system of claim 14 wherein the selection component selects the most visually similar font for which the overall width of each character deviates from the corresponding character of the first font by less than a threshold proportion.

18. The computer system of claim 14 wherein the selection component selects the font for which the overall width of each character deviates the least from that of the corresponding character of the first font.

19. A method in a computer system for providing a second font for a first font having characters with overall widths, the first font having a numerical characterization of its visual characteristics, the method comprising:
   calculating a distance between the numerical characterization of the first font and a numerical characterization of a plurality of fonts;
   identifying a requested number of the fonts having smallest distances;
   selecting one of the identified fonts as the second font, the selected font having characters with overall widths, the overall widths including a leading width, an extent width, and a trailing width; and
   for each character of the second font, decreasing the leading width or the trailing width, so that the overall width is equal to the overall width of the corresponding character of the first font so that the visual appearance of each character of the second font is not changed.

20. A method in a computer system for providing a second font for a first font having characters with overall widths, the first font having a numerical characterization of its visual characteristics, the method comprising:
   identifying, from among a plurality of fonts, at least one font having visually similar characteristics to the first font;
   selecting one of the at least one identified fonts as the second font, the selected font having characters with overall widths, the overall widths including a leading width, an extent width, and a trailing width, the overall widths being within a certain tolerance of the first font; and
   for each character of the second font, decreasing the leading width or the trailing width, so that the overall width is equal to the overall width of the corresponding character of the first font so that the visual appearance of each character of the second font is not changed.

21. A computer-readable medium containing instructions for causing a computer system to provide a second font for a first font having characters with overall widths, the first font having a numerical characterization of its visual characteristics, by:
   calculating a distance between the numerical characterization of the first font and a numerical characterization of a plurality of fonts;
   identifying a requested number of the fonts having smallest distances;
   selecting one of the identified fonts as the second font, the selected font having characters with overall widths, the overall widths including a leading width, an extent width, and a trailing width; and
   for each character of the second font, decreasing the leading width or the trailing width, so that the overall width is equal to the overall width of the corresponding character of the first font so that the visual appearance of each character of the second font is not changed.

22. A computer-readable medium containing instructions for causing a computer system to provide a second font for a first font having characters with overall widths, the first font having a numerical characterization of its visual characteristics, the method comprising:
   identifying, from among a plurality of fonts, at least one font having visually similar characteristics to the first font;
   selecting one of the at least one identified fonts as the second font, the selected font having characters with overall widths, the overall widths including a leading width, an extent width, and a trailing width, the overall widths being within a certain tolerance of the first font; and
   for each character of the second font, decreasing the leading width or the trailing width, so that the overall width is equal to the overall width of the corresponding character of the first font so that the visual appearance of each character of the second font is not changed.

23. A computer system for providing a second font for a first font having characters with overall widths, the first font having a numerical characterization of its visual characteristics, comprising:
   a calculation component to calculate a distance between the numerical characterization of the first font and a numerical characterization of a plurality of fonts;
   an identification component to identify a requested number of the fonts having smallest distances;
   a selection component to select one of the identified fonts as the second font, the selected font having characters with overall widths, the overall widths including a leading width, an extent width, and a trailing width; and
   an adjusting component to decrease, for each character of the second font, the leading width or the trailing width, so that the overall width is equal to the overall width of the corresponding character of the first font so that the visual appearance of each character of the second font is not changed.

24. A computer system for providing a second font for a first font having characters with overall widths, the first font having a numerical characterization of its visual characteristics, comprising:

an identification component to identify, from among a plurality of fonts, at least one font having visually similar characteristics to the first font;

a selection component to select one of the at least one identified fonts as the second font, the selected font having characters with overall widths, the overall widths including a leading width, an extent width, and a trailing width, the overall widths being within a certain tolerance of the first font; and an adjusting component to decrease, for each character of the second font, the leading width or the trailing width, so that the overall width is equal to the overall width of the corresponding character of the first font so that the visual appearance of each character of the second font is not changed.

* * * * *

UNITED STATES PATENT AND TRADEMARK OFFICE
CERTIFICATE OF CORRECTION

PATENT NO. : 6,552,728 B1  Page 1 of 1
DATED : April 22, 2003
INVENTOR(S) : George M. Moore et al.

It is certified that error appears in the above-identified patent and that said Letters Patent is hereby corrected as shown below:

<u>Title page,</u>
Item [63], Related U.S. Application Data, "July 21, 1999" has been replaced with -- July 21, 1997 --.

Signed and Sealed this

Twenty-first Day of October, 2003

JAMES E. ROGAN
*Director of the United States Patent and Trademark Office*